(12) United States Patent
Daily

(10) Patent No.: US 7,475,624 B1
(45) Date of Patent: Jan. 13, 2009

(54) ELECTROMAGNETIC PULSE GENERATOR

(75) Inventor: Robert M. Daily, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 173 days.

(21) Appl. No.: 11/444,812

(22) Filed: May 26, 2006

(51) Int. Cl.
*F41B 15/04* (2006.01)
*B60T 7/16* (2006.01)
*B60L 1/00* (2006.01)

(52) U.S. Cl. .................. 89/1.11; 180/167; 307/10.1
(58) Field of Classification Search .............. 89/1.11; 180/167, 274, 275, 279; 307/9.1, 10.1
See application file for complete search history.

(56) References Cited

U.S. PATENT DOCUMENTS

| | | | | |
|---|---|---|---|---|
| 2,578,263 A * | 12/1951 | Perkins | ........................ | 307/108 |
| 2,721,265 A * | 10/1955 | Rothman et al. | ........... | 331/166 |
| 3,112,004 A * | 11/1963 | Neaville | ..................... | 180/167 |
| 4,660,528 A * | 4/1987 | Buck | .......................... | 123/333 |
| 4,949,216 A * | 8/1990 | Djukastein | .................. | 361/232 |
| 4,996,495 A * | 2/1991 | Birx | ........................... | 327/181 |
| 5,293,527 A | 3/1994 | Sutton et al. | | |
| 5,415,246 A * | 5/1995 | Cooper | ....................... | 180/287 |
| 5,952,600 A | 9/1999 | Herr | | |
| 6,371,000 B1 * | 4/2002 | Hutmacher et al. | .......... | 89/1.11 |
| 7,111,559 B1 * | 9/2006 | MacLachlan | ............... | 102/502 |

OTHER PUBLICATIONS

Mark Berry, Todd Turner, and Christian Reiff, Electrical Vehicle Stopper Evaluation, Phase III-Jaycor, Army Research Laboratory, Oct. 2000, ARL-TR-2273.
Mark Berry, Todd Turner, Christian Reiff, and Benson King, Electrical Vehicle Stopper Evaluation, Phase III-Nonlethal Technologies, Inc. Nov. 2000, ARL-TR-133.

\* cited by examiner

*Primary Examiner*—Bret Hayes
(74) *Attorney, Agent, or Firm*—Fredric J. Zimmerman

(57) ABSTRACT

An electromagnetic pulse delivery system for delivering a sufficient amount of energy and waveform to induce a current in target electronic components that disrupt or damage those target electronic components and overwhelm any protective circuitry. The system includes a power source in communication with a capacitive discharge system capable of producing an electromagnetic pulse. A mechanical interface including a supply contact in communication with the capacitive discharge system and a return contact in communication with a path to earth ground is provided to deliver the electromagnetic pulse to the target object. Physical contact between the mechanical interface and the object closes a switch disposed between the capacitive discharge system and the supply contact for discharging the pulse into the target object.

21 Claims, 6 Drawing Sheets

ELECTROMAGNETIC PULSE GENERATOR

STATEMENT OF GOVERNMENT INTERESTS

The invention described herein may be manufactured and used for the Government of the United States of America for governmental purposes without payment of any royalties thereon or therefore.

FIELD OF THE INVENTION

The present invention is directed to systems for the generation and delivery of electromagnetic pulses.

BACKGROUND OF THE INVENTION

Situations arise when it is necessary to disable motorized vehicles. For example, law enforcement officers often have the need to disable or stop suspect vehicles in order to apprehend suspects and to avoid high-speed vehicular pursuits through residential neighborhoods and public streets. These high-speed pursuits represent a potential hazard to life and property. Similarly, motorized vehicles, including mobile command and control centers, need to be disabled in tactical situations, for example during a military engagement.

Various systems have been used to disable motorized vehicles. The most common system in use today is the spike-strip. In order to work properly, the spike-strip needs to be deployed by hand in the path of an approaching vehicle. The disadvantages of the spike-strip system include the need to anticipate the target vehicle's path and the inherent danger associated with having to deploy the system by hand. In addition, the spike-strip presents a danger to other vehicles traveling along the same path, including the pursuit vehicles.

Other systems use remotely activated engine cut-off switches or transmission disablers. Remote systems utilize equipment, for example a signal receiver that has been previously installed on each target vehicle. A transmitter is used to send a coded disable signal that is received and read by the signal receiving unit. In response to the disable signal, the receiving unit activates switches or other equipment to disable the engine or to disengage the transmission. This system, however, is limited to application on vehicles that can be accessed in advance for installation of the signal receiving unit and other necessary equipment. This type of access is typically not available in spontaneous police pursuits and tactical engagements with hostile enemies. In addition, there are significant costs associated with the equipment and its installation.

Since modem motorized equipment in general, and in particular automobiles, utilize electrical systems and computer electronics, disabling these systems disables the vehicle. One method of disabling the electrical system and electronics is to expose these systems to a pulse of electromagnetic energy. Certain systems use a radiated electromagnetic pulse (EMP) to couple with a target vehicle's circuitry. The radiated EMP is either transmitted through the air or through paths of ionized air created by laser beams. Examples of these systems are described in U.S. Pat. Nos. 5,952,600 and 5,293,527. These systems, however, require bulky and expensive equipment to deliver the desired EMP.

SUMMARY OF THE INVENTION

The present invention is directed to systems and methods for generating and directing an electromagnetic pulse (EMP) into the ground system of a target object containing electronic control systems, for example, a motorized vehicle. In particular, systems and methods in accordance with exemplary embodiments of the present invention deliver an EMP to a moving vehicle by direct contact. The EMP discharge disables the vehicle's computer control circuitry, bringing the vehicle to a halt.

The electromagnetic pulse delivery system includes a power source in communication with a capacitive discharge system that is capable of producing an electromagnetic pulse having sufficient energy and waveform to induce currents in target electronic components that disrupt or damage those target electronic components. In addition, the electromagnetic pulse is capable of overwhelming any protective circuitry associated with the target electronic components. The electromagnetic pulse is delivered to the target object through a mechanical interface in communication with the capacitive discharge system. The mechanical interface includes a supply contact in communication with the capacitive discharge system and a return contact in communication with a low impedance path to earth ground. The supply and return contacts are in physical contact with a conductive surface of the object containing the target electronic components when the mechanical interface is in physical contact with the object. This physical contact closes a normally opened mechanical switch disposed between the capacitive discharge system and the supply contact, discharging the pulse into the target object. The mechanical switch is maintained in the open position by a resilient biasing member. The pulse is returned through the return contact and into an isolated low impedance path to earth ground. The electromagnetic pulse delivery system can be mounted on either a stationary or mobile platform.

DETAILED DESCRIPTION OF EXEMPLARY EMBODIMENTS OF THE INVENTION

Figure 1:
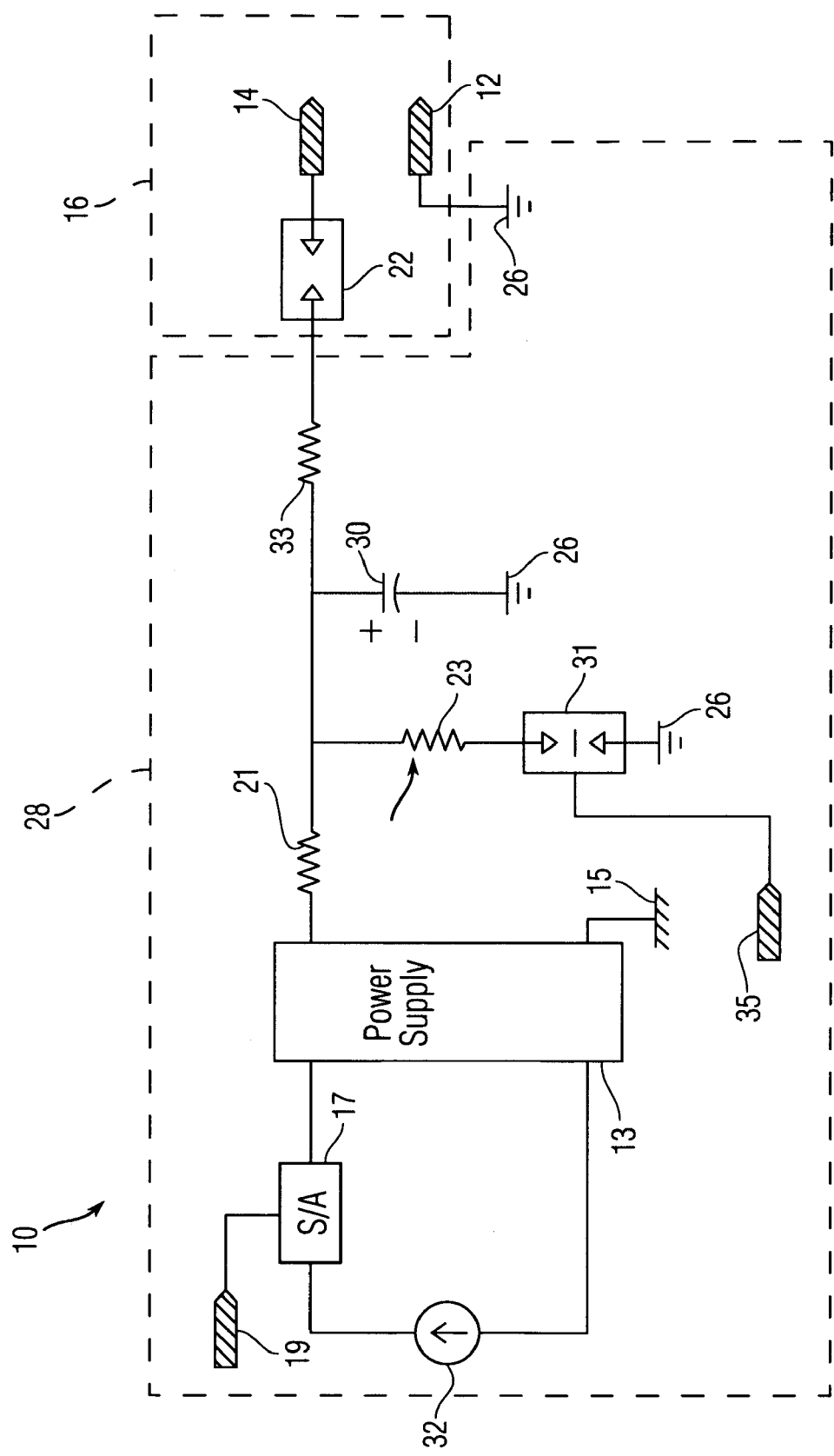
FIG. 1 is a schematic representation of one embodiment of the electromagnetic pulse delivery system in accordance with the present invention.

Referring initially to FIG. 1, an exemplary embodiment of an electromagnetic pulse (EMP) delivery system 10 in accordance with the present invention is illustrated. In an embodiment, the EMP delivery system 10 is mounted to a mobile delivery platform, for example, a motorized vehicle, such as an automobile. The EMP delivery system 10 includes a capacitive discharge system 28, which includes a power source 32 in communication with a high voltage power supply 13. The power source 32 supplies the necessary electrical power to the capacitive discharge system 28. Suitable power sources include batteries, such as automobile batteries, alternators and generators, such as automobile alternators, electrical power grids, alternating current from municipal power supplies and combinations thereof. In an alternate embodiment, the EMP delivery system 10 may be mounted on a stationary delivery platform.

The power derived from the power source 32 is fed into a high voltage power supply 13 that is capable of supplying sufficient charging voltage to the capacitive discharge system to produce an electromagnetic pulse having sufficient energy and waveform to induce currents in target electronic components that disrupt or damage those components. In addition, the electromagnetic pulse that is produced can overwhelm any protective circuitry associated with the target electronic components. In one embodiment, the high voltage power supply 13 produces about 300 kV of charging voltage. In order to protect the on-board electronics associated with the mobile platform upon which the EMP delivery system is mounted, the high voltage power supply is grounded to the chassis of the motorized vehicle. This configuration isolates the ground for the high voltage power supply 13 from Earth ground 26.

Activation of the high voltage power supply is provided by a safety or arming device 17 disposed between the supply side of the power supply 32 and the high voltage power supply 13. A safe/arm signal 19 is delivered to the safe arm device 17 from a digital control circuit (not shown) that continuously monitors the status and operation of the EMP delivery system. Upon activation and delivery of an arm signal to the arming device 17, the high voltage power supply 13 receives power from the power supply 32 and produces the desired charging voltage. Upon activation of a safe signal to the arming device 17, the high voltage power supply 13 ceases operation.

The capacitive discharge system 28 includes a power supply isolation resistor 21 through which the high voltage charge is delivered. The power supply isolation resistor 21 protects the high voltage power supply 13 during discharge of the capacitive discharge system 28 by forcing a majority of the current to flow in a direction away from the high voltage power supply 13 and towards the target of the EMP. In an embodiment, a 500 Megaohm isolation resistor 21 is used to provide isolation between the high voltage power supply and the capacitor 30. With this configuration, it will take approximately 3 seconds to charge a 1 nF capacitor while at the same time ensuring that the vast majority of the current is directed to the discharge contact 14.

The capacitive discharge system 28 also includes at least one capacitor 30 or alternatively, a plurality of capacitors to store and to produce a desired EMP. The capacitor 30 is positioned between the supply side of the high voltage power supply 13 and a path to earth ground 26. Suitable capacitors or arrangements of capacitors are known and available in the art and are based upon the desired output of the capacitive discharge system 28.

Between the discharge of the capacitor 30 and the target of the EMP delivery system is at least one waveform resistor 33, which determines the waveform of the EMP. In an embodiment, the waveform resistor is omitted. This configuration will result in an intrinsic system resistance of between 2 and 5 ohms. In this configuration, the resulting discharge current waveform will be a damped sinusoid with a duration of approximately 5-7 microseconds. In another embodiment, the waveform resistor will have a value of 100 ohms. In this configuration, the current waveform will rise sharply at first and then decay exponentially with a duration of approximately 500 ns.

In addition to using a single waveform resistor 33, a network of high voltage resistors and other electronic components can be used to produce the desired waveform in the EMP. In one embodiment, the EMP is delivered as a damped sine wave having a frequency of approximately 100 MHz and a pulse width of approximately 300 microseconds. In general, the arrangement of voltage, waveform, frequency and pulse width utilized by the EMP is selected to be sufficient enough to disable the computer control circuitry in the target vehicle. This arrangement can vary from vehicle to vehicle.

In order to provide for the controlled release of accumulated charge in the capacitor that is not discharged to the EMP target, the capacitive discharge system includes a bleed down system that includes a bleed down resistor 23 that is connected in series to a controllable electrical switch 31 and through to a path to earth ground 26. The bleed down resistor protects the switch 31 from high discharge currents. In one embodiment, a bleed-down resistor 31 value of 100 Megohms produces a bleed-down current of approximately 3 mA for a duration of approximately 500 ms. Suitable controllable switches include spark-gap devices or other switches as are known and available in the art. Whenever the capacitive discharge system 28 of the EMP delivery system 10 is armed and charged but not deployed, the capacitor 30 is discharged in a controlled manner. The controllable electrical switch 31 is in communication with a bleed down signal 35 received from control circuitry that monitors the EMP delivery system generally and, in particular, the charging and discharging of the capacitor 30. The control circuitry used for the bleed down signal can be the same as or separate from the control circuitry used for the safe/alarm signal. In an embodiment where the controllable electrical switch 31 is a spark-gap device, an electric field is produced in the spark-gap device upon receipt of the bleed down signal, initiating a conductive path to earth ground 26 and safely discharging the capacitor 30.

In an embodiment, the safe/arm signal 19 and the bleed down signal 35 are produced by a safety control circuit, which monitors the current state of the high voltage power supply 13, any mechanical spark-gaps and any other relevant parameters, for example the speed of the automobile upon which the EMP delivery system is mounted. The safety control circuit ensures that the EMP delivery system operates and deploys in a safe manner.

In order to deliver the EMP to an object 38, which includes the target electronics 39 (not shown), the capacitive discharge system 28 is coupled to a mechanical interface 16. The mechanical interface 16 is capable of delivering the EMP to the target electronic components 39 upon physical contact with a vehicle or other device containing the target electronic components. The mechanical interface 16 includes at least one supply contact 14 in communication with the supply side of the capacitive discharge system 28, at least one return contact 12 in communication with a low impedance path to earth ground 26 and at least one switch 22 disposed between the supply contact 14 and the capacitive discharge system 28. The switch 22 is generally a normally open mechanical switch and is capable of moving to a closed position upon physical contact between the supply contact 14 and the object containing the target electronic components. Suitable switches are known and available in the art. In one embodiment, the switch 22 is a spark-gap. When the two points of the spark-gap mechanism are brought sufficiently close to each other, a conductive path is produced from the capacitor 30 and waveform resistor 33 in the capacitive discharge system 28 through the supply contact 14. Once the switch 22 is closed, energy that is stored in capacitors is discharged to the target object and through the ground system of the target object. Accordingly, the mechanical interface 16 is electrically as well as physically intermediate the object 39, which includes the target electronics 39, and the capacitive discharge system 28.

Figure 2:
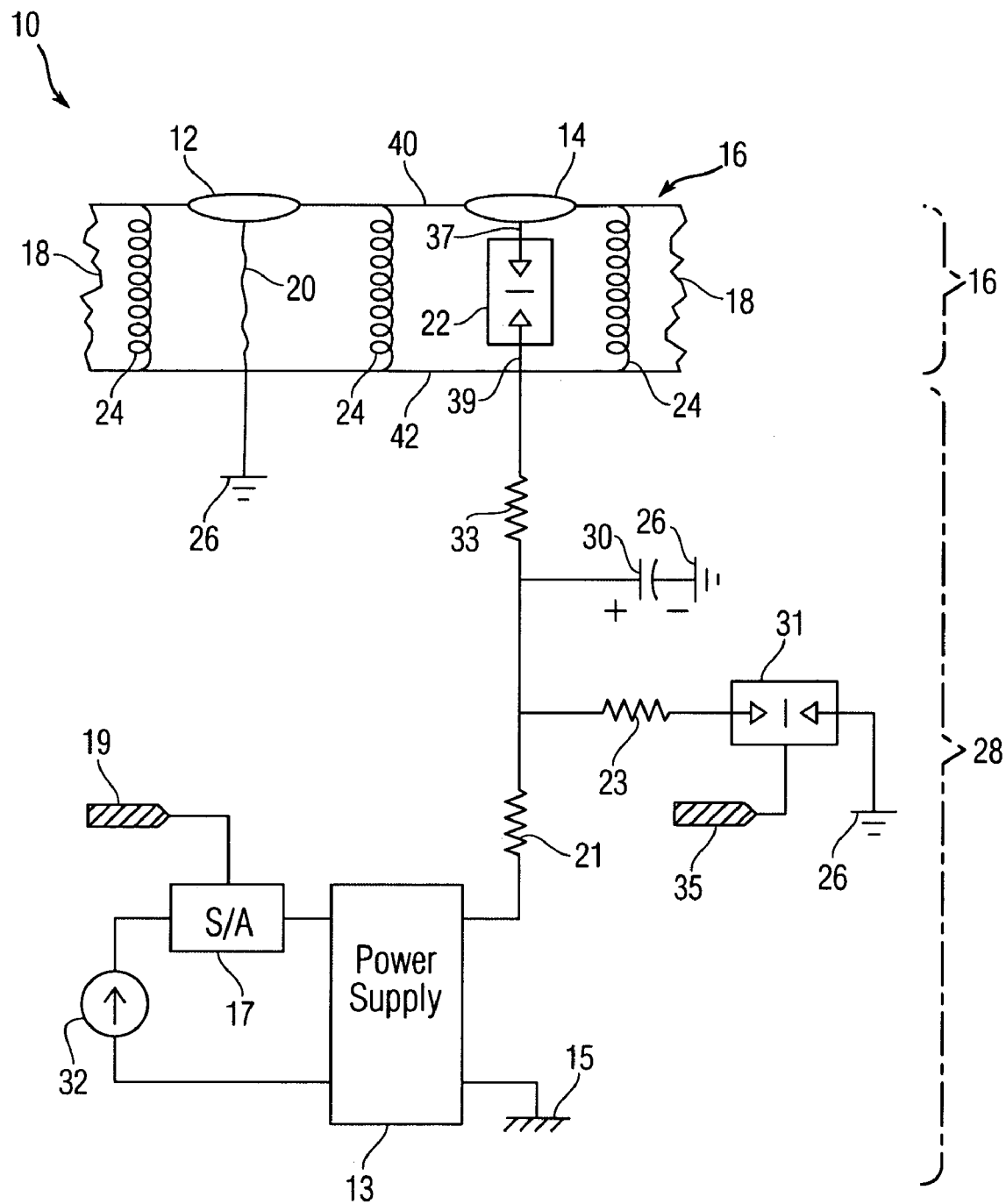
FIG. 2 is a schematic representation of another embodiment of the electromagnetic pulse delivery system in accordance with the present invention.
Figure 3:
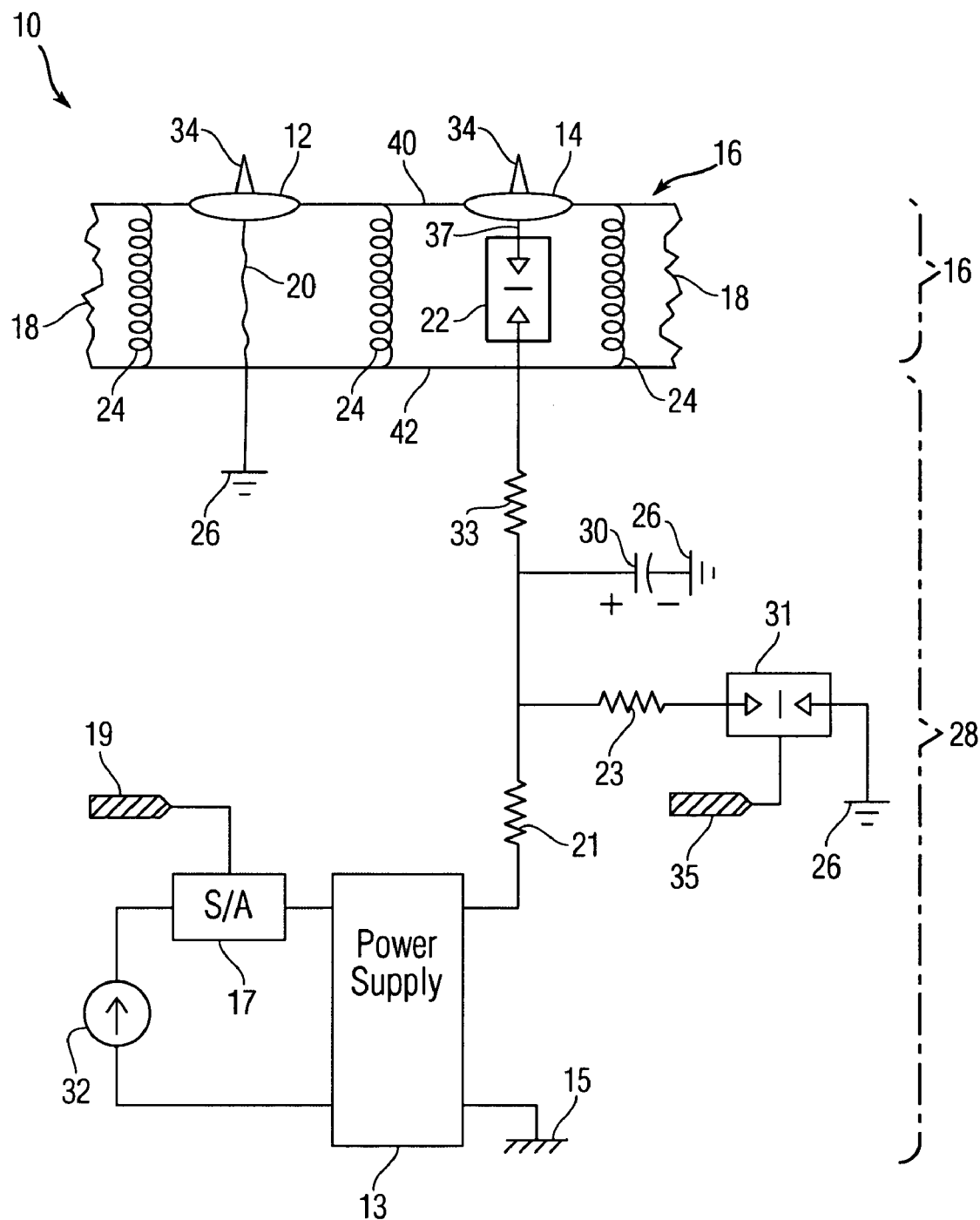
FIG. 3 is a schematic representation of yet another embodiment of the electromagnetic pulse delivery system in accordance with the present invention.
Figure 4:
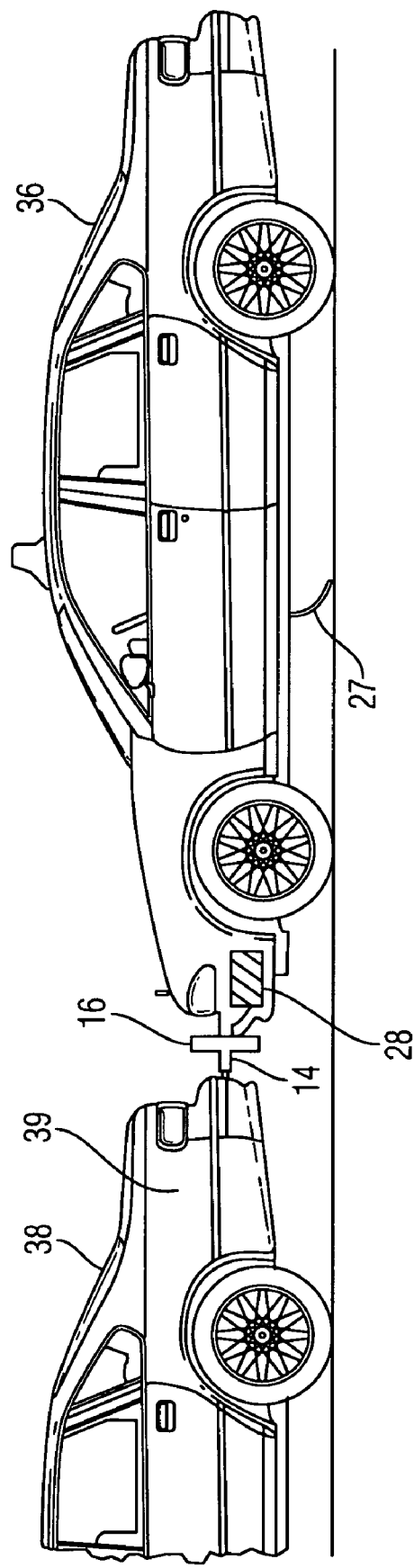
FIG. 4 is a plan view of the electromagnetic pulse delivery system mounted on a mobile platform.

Referring to FIGS. 2-4, exemplary embodiments of the mechanical interface 16 for use with the EMP delivery system mounted on a mobile platform or motorized vehicle are illustrated. As used herein, a motorized vehicle refers to any vehicle either manned or unmanned including but not limited to automobiles, police vehicles, tactical vehicles, motorcycles, airplanes, helicopters, ships, boats, submarines, unmanned underwater vehicles, drones, remote control vehicles, all terrain vehicles, tractors, trucks, buses and construction equipment. As illustrated, the mechanical interface 16 is arranged as a head assembly that can be attached to the mobile delivery platform, for example, a motorized vehicles, such as an automobile 36, and more particularly a police car. The mechanical interface 16 includes the supply contact 14 in communication with the capacitive discharge system 28 and the return contact 12 in communication with a low impedance path to earth ground 26. Suitable earth grounds 26 are generally isolated from the power supply 32 and include grounding strips 27, for example, chains or metal strips that are dragged along the surface of a roadway or a swing arm with a conductive roller in contact with the road surface. The supply and return contacts are in physical contact with the object containing the target electronic components when the mechanical interface is in physical contact with the object (FIG. 4).

In order to provide for physical contact between the electrical contacts and the target object, the electrical contacts generally extend from the mechanical interface 16. Therefore, no other portion of the mechanical interface 16 will interfere with the electrical contacts, which include the supply contact 14 and the return contact 12. As is best shown in FIG. 3, the supply contact 14 and return contact 12 can each include at least one protrusion 34, for example points, barbs or spikes, which are capable of penetrating insulating materials covering the target object or vehicle 38 containing the target electronic components to provide adequate electrical communication between the supply and return contacts and the object. For example, the protrusions 34 can penetrate the plastic or fiberglass body panels that cover the bumpers of an automobile.

In addition to supporting the contacts, the mechanical interface 16 provides the switching mechanism that is activated when the mechanical interface 16 is brought into contact with the object containing the target electronics. In an embodiment, the mechanical interface 16 includes at least one and, more particularly, a plurality of resilient members 24 that bias the switch 22 in a normally open position. Suitable resilient members 24 include, for example, a coil spring, a leaf spring, an elastomer and combinations thereof. As illustrated, the mechanical interface 16 includes a plurality of coil springs 24, which bias a front wall 40 of the mechanical interface 16 away from a back wall 42. The supply contact 14 and one lead 37 from the switch 22 are fixed to the front wall 40, and the other lead 39 from the switch 22 is fixed to the back wall 42. The biasing action of the resilient members 24 are limited by structures, for example baffled side walls 18 of the mechanical interface. The baffled side walls 18 also provide for protection of the internal structures of the mechanical interface 16. Therefore, when the supply and return contacts 14, 12 are brought into contact with the object containing the target electronics, the front wall 40 is moved toward the back wall 42, compressing the resilient members 24 and closing the mechanical switch 22.

The return contact 12 is also fixed to the front wall 40, and movement of the front wall with respect to the back wall 42 is facilitated by providing a sufficient amount of electrical lead 20 between the front and back walls or by facilitating the movement of the back wall with respect to the return lead 20.

Other arrangements of the mechanical switch and biasing members are possible. For example, in one embodiment, the resilient member 24 is a coil spring, and the normally open switch 22 is disposed within the coil spring. Alternatively, the mechanical switch 22 is arranged as a spring loaded cylinder or other projection, which has an insulated head assembly.

In an embodiment as illustrated in FIG. 4, the mechanical interface 16 of the EMP delivery system is mounted on a mobile platform, for example, a front grill or front bumper of a vehicle 36, such as a police vehicle. The mechanical interface 16 of the EMP delivery system makes contact with the object containing the target electronics, for example a target vehicle 38, when the vehicle 36 is positioned behind the target vehicle 38 and brought into contact with the rear end of that vehicle. At this point, the supply and return contacts make physical contact with the target vehicle's metallic structure, compressing the resilient members and closing the switch. Once the switch is closed, the capacitors discharge through the supply contact, into the target vehicle and return to ground through the return contact. In an embodiment, the return path for the discharge is isolated from the electrical system of the police car. Isolation is accomplished by dragging a grounding strip 27, such as, a metallic chain underneath the vehicle 36 to ensure a low impedance path to earth ground.

Figure 5:
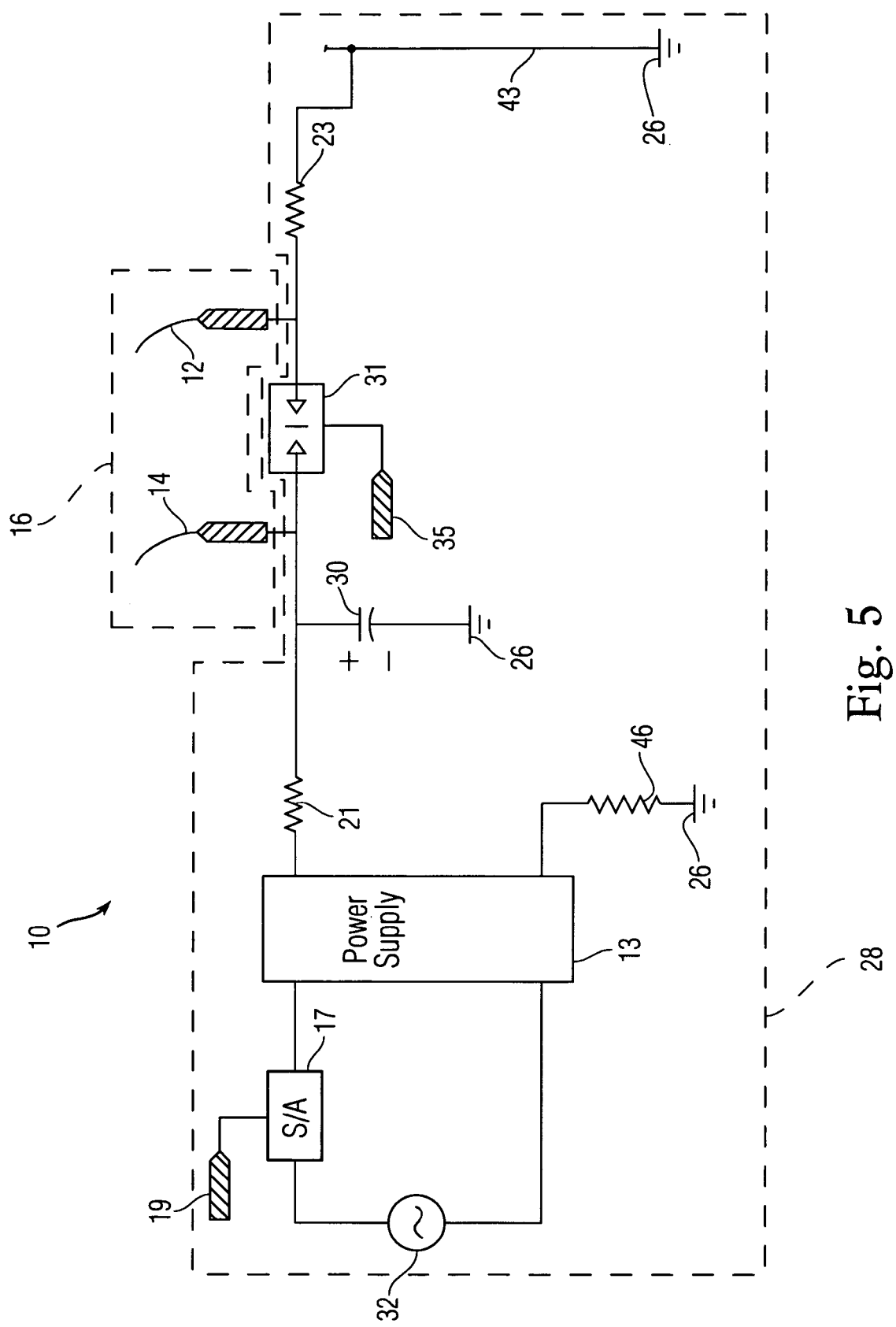
FIG. 5 is a schematic representation of the electromagnetic pulse delivery system arranged for a stationary platform.
Figure 6:
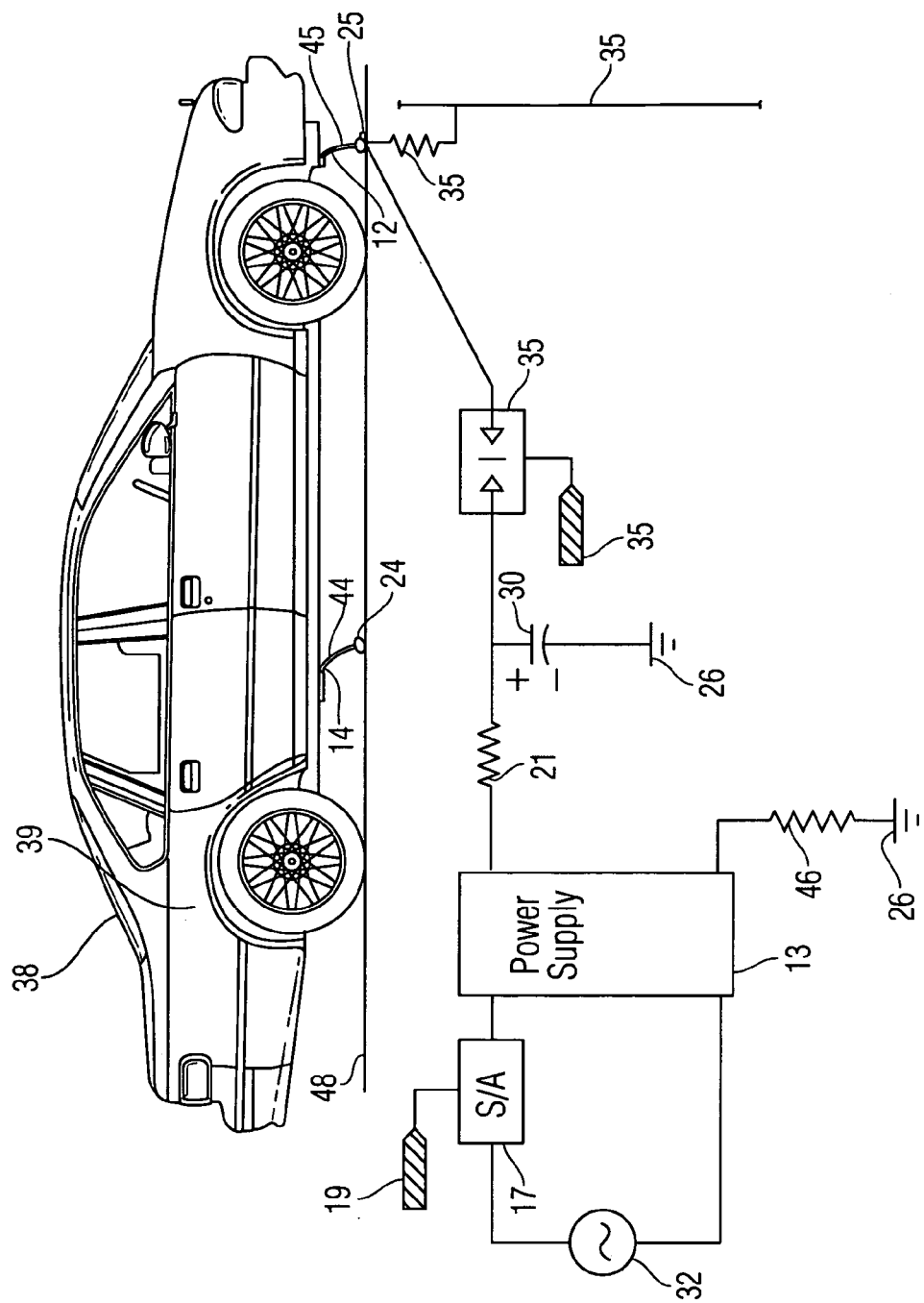
FIG. 6 is a plan view representation of the electromagnetic pulse delivery system mounted on a stationary platform.

Referring to FIGS. 5 and 6, in another exemplary embodiment the EMP delivery system is mounted on a stationary platform, for example fixed to the ground or supported above the ground, such that the mechanical interface makes contact with the mechanical structure of the target vehicle when the vehicle passes within sufficient proximity to the EMP delivery system. As illustrated the delivery system is mounted to the ground, for example a road bed 48, and the mechanical interface is a pair of spring loaded arms 44,45 that are biased up toward the undercarriage of a passing target vehicle 38 vehicle. The first resilient member 24 is the spring that biases the arm up from the ground. The first arm 44 includes the supply contact 14. This contact will serve to energize the frame of the passing vehicle to the same potential as that of the discharge capacitor. As the vehicle proceeds, it makes contact with a second arm 45 and a second resilient member 25. In an embodiment, the first arm 44 is the supply contact 14 and the second arm 45 is the return contact 12. When the target vehicle passes over the second arm 45, the second arm 45 contacts the undercarriage of the car and is pivoted by the second resilient member 25 such that the circuit is closed and an EMP is discharged into the ground system of the target vehicle. The EMP returns to earth ground 26, which is provided by a grounding rod 43.

In this embodiment, the power source 32 is a 115 Vac power source, for example from a generator or power grid. In addition, the high voltage power supply 13 is grounded through a path to earth ground 26, for example using a grounding rod or other suitable device. Since isolation for the ground source is not provided by a vehicle chassis, an insulation resistor 46 is provided in series between the high voltage power supply 13 and the path to Earth ground 26. The waveform circuitry and in particular the waveform resistor 33 is positioned in series between the second arm 45 and the grounding rod 43. The bleed down system including the bleed down spark-gap is placed between the first and second arms. The bleed down signal shorts the contacts of the spark-gap to discharge any stored energy through the waveform resistor 33 and into the ground rod 43.

In operation, exemplary embodiments of EMP delivery systems, in accordance with the present invention, act upon the ground system of the target vehicle. Since all of the electrical subsystems of the vehicle have a common ground, a change in that ground system affects all of the electrical and electronic systems in the target vehicle. These electrical and electronic systems include the computers that control vital operational functions of the target vehicle using integrated circuitry. Integrated circuitry is highly susceptible to any electrostatic discharge (ESD) and is protected by isolation and ESD protection circuitry. Therefore, exemplary EMP systems in accordance with the present invention deliver pulses having the energy and waveform necessary to overwhelm any ESD protection circuitry and to disable the target vehicle's computer control network.

EMP delivery systems in accordance with the present invention are easy and inexpensive to construct, install and deploy and can easily be retrofitted to any existing type of deployment system including mobile systems such as police or military vehicles and stationary systems such as stationary contact strips. Complex and costly transmitters and lasers to transmit the pulse are eliminated as is the reliance on cutting edge technologies that may not be fully mature. Exemplary systems in accordance with the present invention utilize readily available electronic components and a mechanical switching system. Systems in accordance with the present invention eliminate the need for a receiver or other circuitry to be installed on the target vehicle.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An electromagnetic pulse delivery system, comprising:
   a capacitive discharge system comprising a power source, the capacitive discharge system capable of producing an electromagnetic pulse including sufficient energy and waveform for inducing a current in target electronic components, which at least one of disrupts and damages the target electronic components and overwhelms any protective circuitry associated with the target electronic components; and
   a mechanical interface in communication with the capacitive discharge system, the mechanical interface being capable of delivering the electromagnetic pulse to an object, including the target electronic components, upon physical contact with the object,
      wherein the electromagnetic pulse delivery system is mounted on a vehicle, and
      wherein said mechanical interface is a compressible mechanical interface, which is comprised of a moveable, front wall, a back wall and at least one resilient member.

2. The system of claim 1, wherein the power source comprises at least one of a vehicle battery, and a vehicle generator.

3. The system of claim 1, wherein the capacitive discharge system comprises at least one capacitor.

4. The system of claim 1, wherein the capacitive discharge system comprises at least one waveform resistor capable of modifying a waveform associated with the electromagnetic pulse.

5. The system of claim 1, wherein the vehicle comprises an automobile.

6. The system of claim 1, wherein the mechanical interface comprises a supply contact in communication with the capacitive discharge system and a return contact in low impedance path to earth ground, and
   wherein the supply contact and the return contact are in electrical contact with the object, including the target electronic components, when the mechanical interface is in physical contact with the object.

7. The system of claim 6, further comprising a switch, normally open, being disposed between the supply contact and the capacitive discharge system,
   wherein the switch is capable of moving to a closed position upon physical contact between the supply contact and the object, which contains the target electronic components.

8. The system of claim 6, further comprising a switch, normally open, being disposed between the supply contact and the capacitive discharge system; and
   at least one resilient member for biasing the switch in an open position.

9. The system of claim 6, further comprising a switch, normally open, being disposed between the supply contact and the capacitive discharge system; and
   at least one resilient member for biasing the switch in an open position,
      wherein said at least one resilient member comprises at least one of a coil spring, a leaf spring, and an elastomer.

10. The system of claim 6, further comprising a switch, normally open, being disposed between the supply contact and the capacitive discharge system; and
    at least one resilient member for biasing the switch in an open position,
       wherein the resilient member comprises a coil spring and the switch is disposed within the coil spring.

11. The system of claim 6, wherein the supply and return contacts further comprise at least one protrusion capable of penetrating insulating materials covering the object to provide adequate electrical communication among the supply contact, the return contact and the object.

12. The system of claim 6, further comprising a switch, normally open, being disposed between the supply contact and the capacitive discharge system, the switch capable of moving to a closed position upon physical contact between the supply contact and the object, which includes the target electronic components,
    wherein the switch comprises a spark-gap switch configuration.

13. The system of claim 1, further comprising a bleed down spark: gap being capable of releasing energy stored in the electromagnetic pulse delivery system.

14. The system of claim 1, further comprising a high voltage power supply in communication with the power source, the high voltage power supply capable of supplying between about 50 kV and about 300 kV to a capacitor.

15. The system of claim 14, further comprising an arming device disposed between the power source and the high voltage power supply where the arming device controls the delivery of power from the power source to the high voltage power supply.

16. An electromagnetic pulse delivery system, comprising:
a capacitive discharge system comprising a power source, the capacitive discharge system capable of producing an electromagnetic pulse including sufficient energy and waveform for inducing a current in target electronic components, which at least one of disrupts and damages the target electronic components and overwhelms any protective circuitry associated with the target electronic components, the capacitive discharge system comprising at least one capacitor; and
a mechanical interface in communication with the capacitive discharge system,
wherein the mechanical interface comprises a supply contact in communication with the capacitive discharge system and a return contact in communication with a low impedance path to earth ground, and
wherein the supply contact and the return contact are in electrical contact with an object, including the target electronic components, when the mechanical interface is in physical contact with the object in order to deliver the electromagnetic pulse to the target electronic components,
wherein the electromagnetic pulse delivery system is mounted on a motorized vehicle, and
wherein said mechanical interface is a compressible mechanical interface, which is comprised of a moveable, front wall, a back wall and at least one resilient member.

17. The system of claim 16, wherein the capacitive discharge system comprises circuitry capable of modifying a waveform associated with the electromagnetic pulse.

18. The system of claim 16, further comprising a switch, normally open, being disposed between the supply contact and the capacitive discharge system, the switch moves to a closed position upon physical contact between the supply contact and the object, which includes the target electronic components.

19. The system of claim 18, further comprising at least one resilient member for biasing the switch in an open position.

20. The system of claim 18, further comprising at least one resilient member for biasing the switch in an open position,
wherein the resilient member comprises a coil spring, said switch is disposed within the coil spring.

21. The system of claim 16, wherein the supply contact and the return contact further comprise at least one protrusion to penetrate insulating materials covering the object, which includes the target electronic components, in order to provide adequate electrical communication among the supply contact, the return contact and the object.

* * * * *